(12) United States Patent
Icard

(10) Patent No.: US 11,933,455 B2
(45) Date of Patent: Mar. 19, 2024

(54) PRESSURIZED GAS TANK COMPRISING AT LEAST TWO CYLINDERS CONNECTED BY A RAIL

(71) Applicant: FAURECIA SYSTEMES D'ECHAPPEMENT, Nanterre (FR)

(72) Inventor: Sullivan Icard, Thionville (FR)

(73) Assignee: FAURECIA SYSTEMES D'ECHAPPEMENT (FR)

( * ) Notice: Subject to any disclaimer, the term of this patent is extended or adjusted under 35 U.S.C. 154(b) by 0 days.

(21) Appl. No.: 17/724,572

(22) Filed: Apr. 20, 2022

(65) Prior Publication Data
US 2022/0341544 A1 Oct. 27, 2022

(30) Foreign Application Priority Data
Apr. 23, 2021 (FR) ...................... 21 04248

(51) Int. Cl.
*F17C 1/00* (2006.01)
*F17C 5/00* (2006.01)
*F17C 7/00* (2006.01)

(52) U.S. Cl.
CPC .................. *F17C 1/00* (2013.01); *F17C 5/00* (2013.01); *F17C 7/00* (2013.01);
(Continued)

(58) Field of Classification Search
CPC ...... F17C 1/00; F17C 5/00; F17C 7/00; F17C 2201/0109; F17C 2205/0142;
(Continued)

(56) References Cited

U.S. PATENT DOCUMENTS 2,011,347 A * 8/1935 Ragonnet ................ B60P 3/222
222/3
2,761,397 A * 9/1956 Holst ...................... B60P 3/055
280/837

(Continued)

FOREIGN PATENT DOCUMENTS

| FR | 2905446 A1 | 3/2008 | |
| FR | 3099539 A1 | 2/2021 | |
| GB | 2552781 A * | 2/2018 | .............. F17C 13/04 |

OTHER PUBLICATIONS

French Preliminary Search Report for Application No. 2104248 dated Jan. 13, 2022.

*Primary Examiner* — Timothy P. Kelly
*Assistant Examiner* — Stephanie A Shrieves
(74) *Attorney, Agent, or Firm* — Carlson, Gaskey & Olds, P.C.

(57) ABSTRACT

A pressurized gas tank comprises at least two cylinders and a rail capable of fluidly connecting the at least two cylinders. At least one cylinder includes a base for connection to the rail. The rail includes at least one reception area of a shape substantially complementary to a shape of the base. The base has a shape substantially revolutionary about a first axis and comprises a number at least equal to n of angularly equidistant tapped holes. The at least one reception area comprises a number equal to n of ports, in the form of an arc of a circle, angularly equidistant, of width substantially equal, by greater value, to a diameter of a tapped hole and of angular extent substantially equal to 360°/n.

18 Claims, 8 Drawing Sheets

(52) U.S. Cl.
CPC ............... *F17C 2201/0109* (2013.01); *F17C 2205/0142* (2013.01); *F17C 2221/012* (2013.01)

(58) Field of Classification Search
CPC ........ F17C 2221/012; F17C 2205/0146; F17C 2205/0305; F17C 2205/0332; F17C 2209/228; F17C 2260/018; F17C 3/08; Y02E 60/32; B60K 15/07; B60K 15/03519
USPC .................................. 141/18; 137/266, 267
See application file for complete search history.

(56) References Cited

U.S. PATENT DOCUMENTS

| | | | | |
|---|---|---|---|---|
| 4,542,774 A | * | 9/1985 | Stavlo | F17C 13/085 141/237 |
| 4,784,399 A | * | 11/1988 | Finn | F17C 13/085 410/48 |
| 5,515,997 A | * | 5/1996 | Kirk | B60P 3/055 220/1.5 |
| 5,676,180 A | * | 10/1997 | Teel | F17C 5/06 137/267 |
| 5,709,252 A | * | 1/1998 | Princiotta | F17C 13/12 108/55.3 |
| 6,240,909 B1 | * | 6/2001 | Scott | F17C 13/04 123/527 |
| 6,321,775 B1 | * | 11/2001 | Hildebrand | B60K 15/07 137/79 |
| 9,206,946 B2 | * | 12/2015 | Mayr | F17C 13/002 |
| 10,221,999 B2 | * | 3/2019 | Croteau | F17C 1/16 |
| 2009/0283351 A1 | | 11/2009 | Cannet et al. | |
| 2011/0272048 A1 | | 11/2011 | Glaeser et al. | |
| 2014/0130896 A1 | * | 5/2014 | Mayr | F17C 1/00 137/263 |
| 2019/0047409 A1 | * | 2/2019 | Kataoka | F17C 1/14 |
| 2022/0203826 A1 | * | 6/2022 | Fujii | F17C 13/084 |

* cited by examiner

PRESSURIZED GAS TANK COMPRISING AT LEAST TWO CYLINDERS CONNECTED BY A RAIL

CROSS-REFERENCE TO RELATED APPLICATIONS

This application is a U.S. non-provisional application claiming the benefit of French Application No. 21 04248, filed on Apr. 23, 2021, which is incorporated herein by reference in its entirety.

TECHNICAL FIELD

The disclosure relates to a pressurized gas tank, such as hydrogen, more particularly a tank for a vehicle, of the flat tank type, comprising at least two cylinders connected by a connecting rail.

BACKGROUND

It is known to increase the storage capacity of a tank, while remaining in a substantially flat parallelepiped volume, by juxtaposing cylinders, such as substantially cylindrical cylinders, and by connecting them with a rail. Advantageously, the rail allows functions such as filling, drawing and safety to be centralized.

SUMMARY

The disclosure provides an interface between a cylinder and rail allowing the cylinder to be arranged in any orientation around its axis.

In one example, a tank for pressurized gas, such as hydrogen, is provided that comprises at least two cylinders and a rail capable of fluidly connecting said at least two cylinders, in order to form a single storage capacity. At least one cylinder comprises a base for connection to the rail. The rail comprises at least one reception area of a shape substantially complementary to the shape of the base, in order to be able to receive a base. The base has a shape substantially revolutionary about a first axis and comprises a number at least equal to n of tapped holes angularly equidistant on a first circle of diameter and whose axis is the first axis. The at least one reception area comprises a number equal to n of ports in the form of an arc of a circle, angularly equidistant on a second circle of the same diameter and whose axis is the first axis, centered on the first axis, with a width substantially equal, by greater value, to a diameter of a tapped hole and angular extent substantially equal to $360°/n$.

Particular characteristics or embodiments, usable alone or in combination, are:
- the number of tapped holes is equal to 2n, double the number n of ports,
- the tank comprises a number n of screws, each screw having its shank passing through a port, being screwed into a tapped hole and having its head resting against the outside of the port,
- a base also comprises, at its end, at least one first surface, substantially flat and perpendicular to the first axis, and a reception area also comprises, opposite the said at least one first surface of the base, as many second surfaces, substantially flat and perpendicular to the first axis,
- a base has at least one first cylindrical shape, respectively solid or hollow, whose axis is the first axis and of circular cross-section, and a reception area comprises as many second cylindrical shapes, respectively solid or hollow, whose axis is the first axis and a circular cross-section, complementary to the at least one first cylindrical shape,
- a base has at least one third cylindrical shape, respectively solid or hollow, whose axis is the first axis and of circular cross-section, and a reception area comprises as many fourth cylindrical shapes, respectively solid or hollow, whose axis is the first axis and of circular section, complementary to said at least one third cylindrical shape,
- the tank further comprises at least one joint, interposed between said at least one first substantially flat surface and said second substantially flat surface, between said at least one first cylindrical shape and said second cylindrical shape and/or between said at least one third cylindrical shape and said fourth cylindrical shape,
- the base is pierced by a first pipe parallel to the first axis, preferably centered on the first axis, and the reception area comprises a second pipe opening out opposite the first pipe,
- the rail extends mainly along a second axis substantially perpendicular to the first axis, comprises at least two sections along the second axis, through which the second pipe passes,
- a section comprises, at a first end, a first connection interface enabling the second pipe to be connected in a sealed manner and, at a second opposite end, a second connection interface enabling the second pipe to be connected in a sealed manner, and where a first connection interface of one section is capable of being connected to a second end of another section,
- the tank further comprises first end equipment capable of being connected to a first interface and second end equipment capable of being connected to a second interface,
- the first end equipment is designed to make it possible to fill the tank and the second end equipment is designed to make it possible to draw from the tank.

BRIEF DESCRIPTION OF THE DRAWINGS

The disclosure will be better understood from the following description, made only by way of example, and with reference to the appended Figures in which.

DETAILED DESCRIPTION

Figure 1:
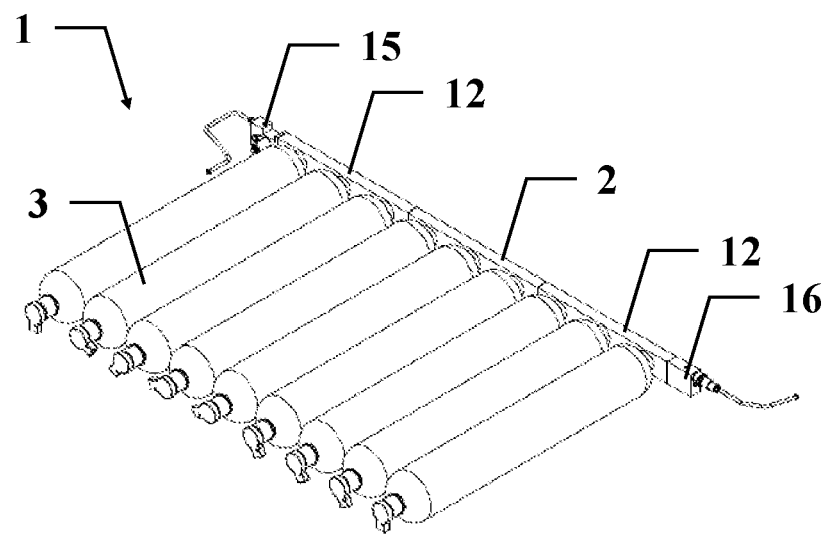
FIG. 1 shows, in perspective view, a tank according to the disclosure.
Figure 2:
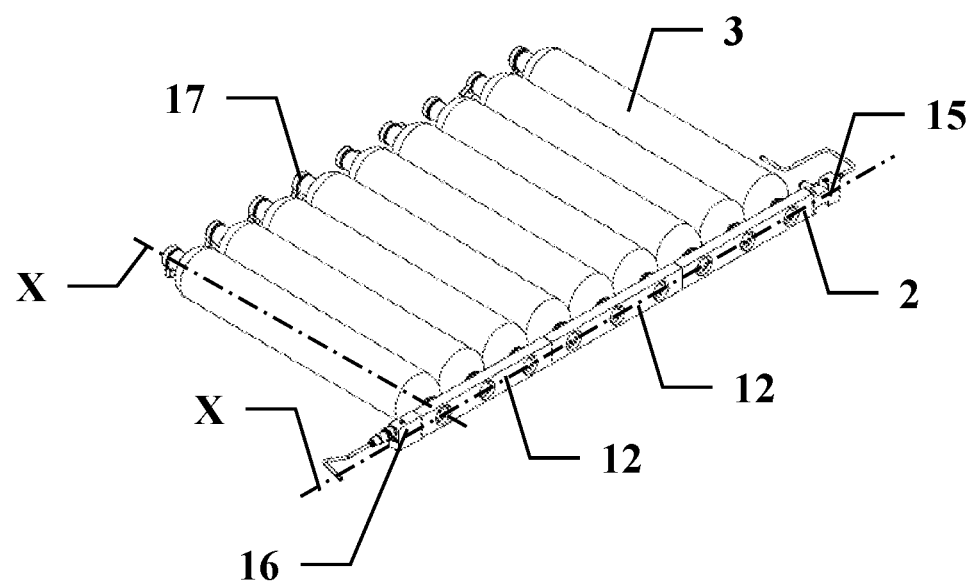
FIG. 2 shows, in perspective view, the tank of FIG. 1.
Figure 3:
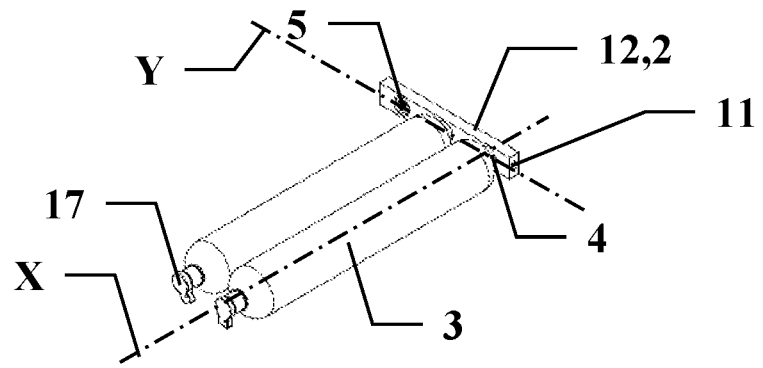
FIG. 3 shows, in perspective view, a subassembly of the tank of FIG. 1, with a cylinder removed.

With reference to FIGS. 1, 2, 3, 8, a tank 1 for pressurized gas, such as hydrogen, comprises a rail 2 and a plurality of cylinders 3, for example nine cylinders as shown in FIGS. 1 and 2. The rail 2, which is preferably rigid, is designed to make it possible to fluidly connect the cylinders 3 of the plurality. This connection is such as to form a single gas storage capacity, via free fluid communication, ensured by the rail 2 between all the cylinders 3.

For this, a cylinder 3 comprises a base 4 for connection to the rail 2 and the rail 2 comprises at least one reception area 5. A reception area 5 has a shape substantially complementary to the shape of the base 4, so as to be able to receive a base 4.

According to one feature, as illustrated in FIGS. 4-7, a base 4 has a substantially revolutionary shape about a first axis X. The first axis X is the docking axis of a base 4 in a reception area 5. A base 4 comprises tapped holes 6, angularly equidistant on a first circle C1. The first circle C1 has a diameter D and is centered on the first axis X.

Figure 4:
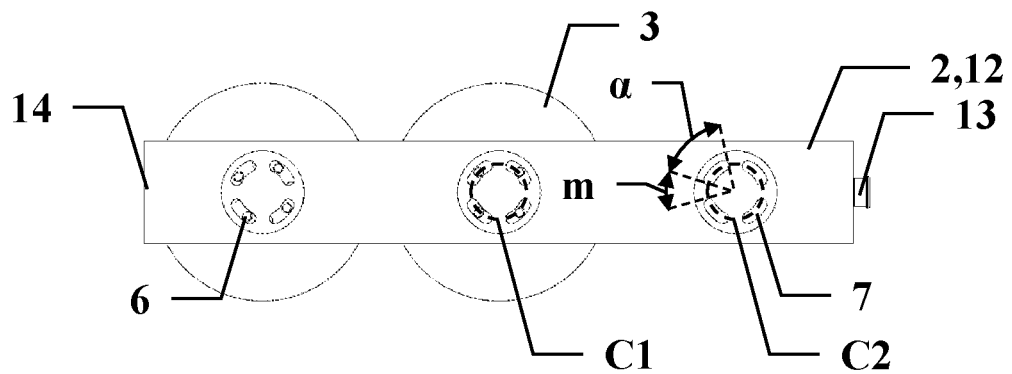
FIG. 4 shows, seen from the rail side, the sub-assembly of FIG. 3.
Figure 5:
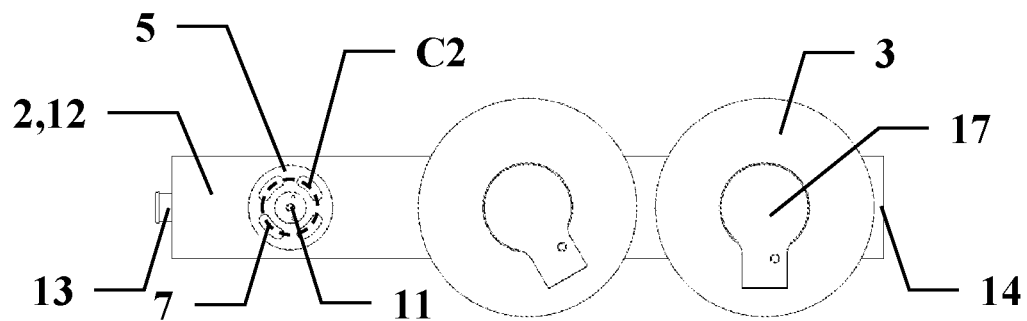
FIG. 5 shows, seen from the cylinder side, the subassembly of FIG. 3.
Figure 7:
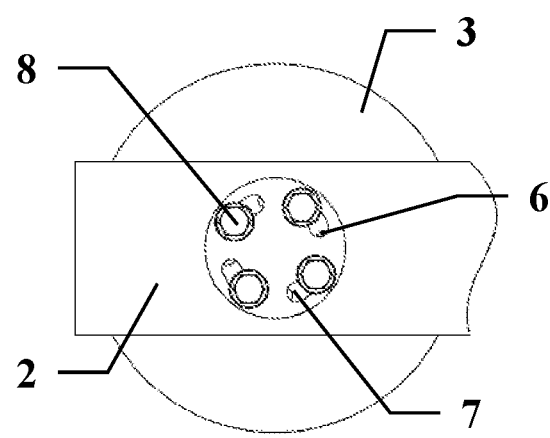
FIG. 7 shows, along the X-axis, the rail mounted on the base of FIG. 6
Figure 8:
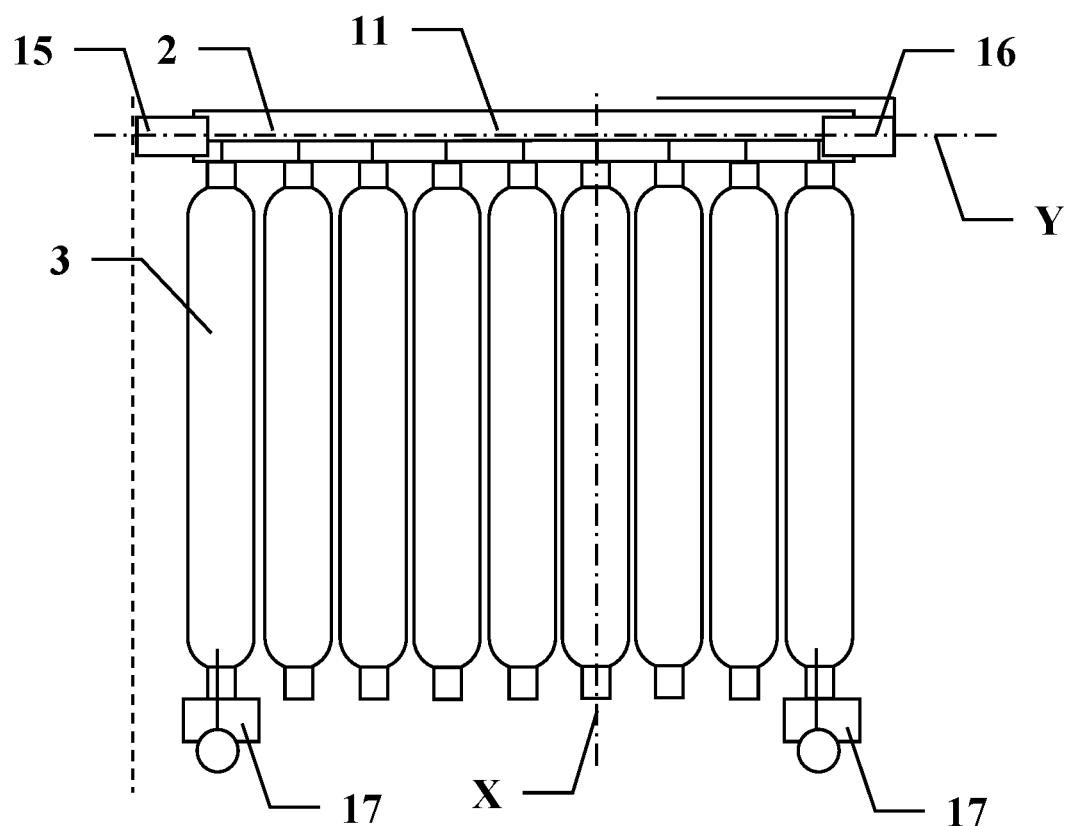
FIG. 8 shows, viewed from above, a tank.

In a complementary manner, a reception area 5 comprises ports 7. The ports 7 pass through the rail 2. They have an outer side and an inner side, where a reception area 5 is located. As illustrated in FIGS. 4, 5, 7, the ports 7 are shaped in the form of an arc of a circle, and are arranged angularly equidistant on a second circle C2. The second circle C2 has a diameter D identical to the diameter of the first circle C1. The circle C2 is centered on the first axis X. The arc of a port 7 is an arc of the circle C2, centered on the first axis X. Each port 7 has a bean shape, of width 1, substantially constant and equal to, and slightly larger than, the diameter d of a tapped hole 6 and angular extent $\alpha$. If n is the number of ports 7, the number of tapped holes 6 is at least equal to n. The circumference occupied by the ports 7 is maximized, so the angular extent $\alpha$ is as close as possible to $360°/n$ and is limited only by the following port 7. Advantageously, the ports 7 all have the same angular extent $\alpha$.

A port 7 has a width 1 sufficient to make possible the passage of a screw 8 of nominal diameter d capable of being screwed into a tapped hole 6. This width 1 is sufficiently restricted so as to not let the head of such a screw 8 pass through.

An angular extent $\alpha$, equal to $360°/n$ is ideal, in that enough material should be kept between two ports 7 to ensure the solidity of the rail 2. Also, the angular extent $\alpha$, equal to $360°/n$, is in practice reduced by an angular margin m.

The above features make it possible to make a solid connection between a reception area 5 and a base 4. The screwing ensures that the assembly is immobilized. Very advantageously, before tightening the screws, the preceding characteristics make it possible to vary the orientation of the base 4 relative to the reception area 5 about the first axis X. This makes it possible to select and then immobilize the orientation of a cylinder 3 relative to the rail 2 about the first axis X.

This is advantageous in that a cylinder 3 comprises a safety device 17 at its end opposite the end carrying the base 4. This safety device makes it possible for gas to escape through a release nozzle in the event of excess pressure. This nozzle is oriented. Also, the possibility of orienting the cylinder 3 relative to the rail 2 advantageously makes it possible to set the nozzle orientation, at the last moment, during the assembly of the cylinder 3 with the rail 2.

The rail 2 can be any shape. Similarly, the face of the rail 2 that receives a cylinder 3 and the direction in which it is received can be any. The cylinders can also be any shape. However, according to one advantageous feature, if the rail 2 is straight and if all the reception areas 5 are arranged on the same face of the rail 2 and in directions parallel to each other, the tank 1 advantageously has the shape of a comb. If, in addition, the cylinders 3 have an extended shape along the docking axis X, the tank 1 advantageously has a substantially flat shape, which is advantageous for vehicle integration.

According to another feature, more particularly visible in FIGS. 4-7, the number of tapped holes 6 angularly equidistant on a first circle C1 is advantageously equal to 2n, double the number n of ports 7. Such a feature is advantageous in that it makes an indexing modulo $360°/2n$ possible. This indexing makes it possible to compensate the blind spot area resulting from the angular margin m. Indeed, a rotation of $360°/2n$ makes it possible to always find a tapped hole in front of the port 7. The ports in turn makes continuous indexing possible over an angular range. By combining the two previous indexes, it is possible to index the base 4 relative to the reception area 5 according to any angle from $0°$ to $360°$, without any blind spot area. Any orientation can be given to the cylinder 3 relative to the rail 2, with as fine a resolution as necessary.

Figure 6:
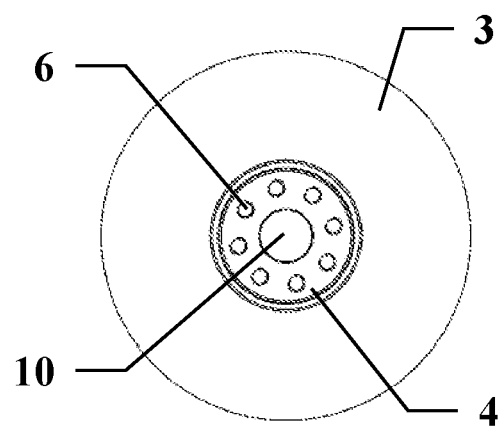
FIG. 6 shows, along the X axis, a base of a cylinder.

According to another feature, more particularly illustrated in FIGS. 6, 7, the tank 1 comprises, for each cylinder 3, a number n of screws 8, to make its assembly with the rail 2 possible. Each screw 8 has its shank passing through a port 7, is screwed into a tapped hole 6 and has its head resting against the outside of the port 7. The screwing then ensures that the reception area 5 is held under pressure against the base 4.

The number n can be any integer. The Figures all illustrate the case of n=4. Or four ports 7 and four screws 8. Similarly, the bases 4 have 2n=8 tapped holes 6.

The shape of the profile of the base 4 in a plane passing through the first axis X, can be any shape, as long as it is symmetrical with respect to the first axis X, because of the revolutionary property. The same applies to the corresponding profile of the reception area 5, which must also be complementary to the profile of the base 4.

According to one embodiment characteristic of this profile, a base 4 further comprises, at its end, at least a first substantially flat surface, perpendicular to the first axis X. In a corresponding manner, a reception area 5 also comprises, opposite the first surface of the base 4, as many second substantially flat surfaces, perpendicular to the first axis X. Thus, during the assembly by screwing, a flat plane surface comes into contact and under pressure against a second homologous flat surface.

Thus, a tightening, by screwing, of the first surface against the second surface, makes it possible, if necessary, by interposing a joint, to seal between rail 2 and cylinder 3. This characteristic is not illustrated.

The tapped hole 6 can have any orientation. Advantageously, this orientation is normal at the end surface of the base 4. Also, according to the above characteristic, a tapped hole 6 is advantageously normal at said at least first and second flat surfaces. The illustrated configuration is found where the tapped holes 6 are parallel to each other and to the first axis X.

According to another feature, a base 4 has at least a first cylindrical shape 18 respectively solid or hollow, whose axis is the first X axis, and having a circular section and a reception area 5 comprises as many second cylindrical shape 19, respectively hollow or solid, whose axis is the first X axis, and having a circular section, complementary to said at least one first cylindrical shape 18. When a first cylindrical shape 18, base side 4, is solid, due to the complementarity, a second cylindrical shape 19, on the reception area 5 side, is hollow and vice versa.

According to another feature, a base 4 has at least a third cylindrical shape 20 respectively solid or hollow, whose axis is the first X axis, and having a circular section and a reception area 5 comprises as many fourth cylindrical shape 21, respectively hollow or solid, whose axis is the first X axis, and having a circular section, complementary to the said at least third cylindrical shape 20.

Figure 12:
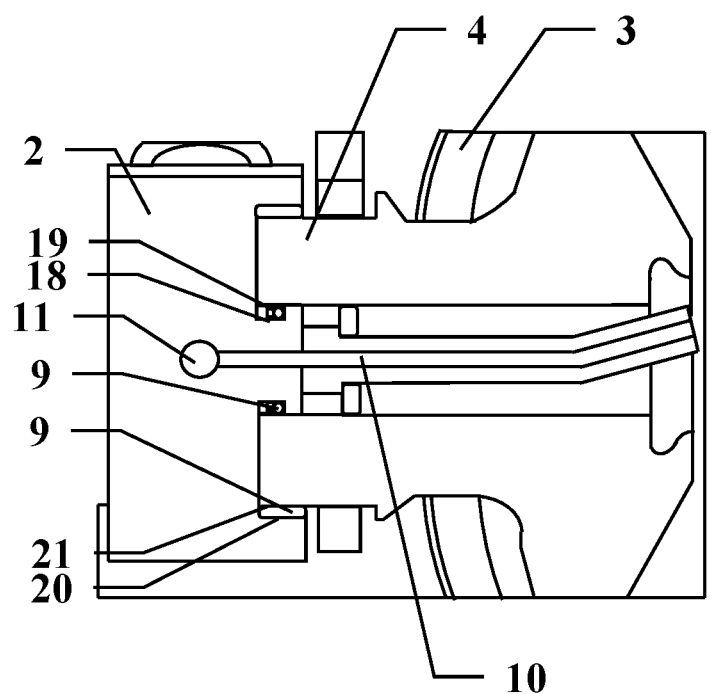
FIG. 12 shows, in a cropped view along an XY plane, the detail of the interface between the base and the reception area.

Thus, according to the embodiment illustrated in FIG. 12, the base 4 comprises a first solid cylindrical shape 18, and a third hollow cylindrical shape 20. The reception area 5 comprises, in a complementary manner, a second hollow cylindrical shape 19, with a diameter slightly larger than the diameter of the first cylindrical shape 18 in order to be able to receive the latter, and a fourth solid cylindrical shape 21, with a diameter slightly smaller than the diameter of the third cylindrical shape 19 in order to be able to penetrate the latter. This makes it possible to form a double nested cylinder forming a baffle. This also makes it possible to have cylindrical surfaces that are respectively matched and facing each other and whose axis is the first X axis.

By placing a joint 9 between two of these mating surfaces, it is possible to achieve a seal. This is more particularly illustrated in FIGS. 9 and 12.

Also, according to a further feature, the tank 1 further comprises at least one joint 9, interposed between said at least one first substantially flat surface and said second substantially flat surface, between said at least one first cylindrical shape 18 and said second cylindrical shape 19 and/or between said at least one third cylindrical shape 20 and said fourth cylindrical shape 21.

The assembly of the base 4 with a reception area 5 further makes it possible to ensure fluid continuity between a cylinder 3 and the rail 2 and thus between all the cylinders 3. According to another characteristic, the base 4 is pierced with a first pipe 10. This first pipe 10 is advantageously parallel to the first axis X, and is preferably centered on the first axis X. The reception area 5 comprises a second pipe 11 opening out opposite the first pipe 10.

FIG. 12 shows a cropped view of the interface between a base 4 of a cylinder 3 and a reception area 5 of a rail 2.

According to another feature, the rail 2 extends mainly along a second axis Y substantially perpendicular to the first axis X. The rail 2 is crossed, along the second axis Y, by the second pipe 11. This second pipe 11 comprises, in line with each reception area 5, a branch substantially perpendicular to the second axis Y, in order to fluidly connect each of the reception areas 5.

According to another feature, the rail 2 comprises at least two sections 12 along the second axis Y. These plural sections 12, advantageously identical, make it possible to constitute a rail 2 of variable length by adding sections 12, according to the length, depending on the number of cylinders 3, desired. This offers an advantageous modularity, in order to adapt the size of a tank 1 to the needs.

A section 12 may comprise any number of reception areas 5. This number can be as small as 1. The Figures illustrate sections with three reception areas 5, so as to be able to receive three cylinders 3.

In order to be assembled together, the sections 12 comprise, at a first end, a first connection interface 13 for tightly connecting the second pipe 11 and at a second opposite end, a second connection interface 14 for tightly connecting the second pipe 11 and where a first interface 13 of a section 12 is able to connect to a second end 14 of another section 12.

Figure 11:
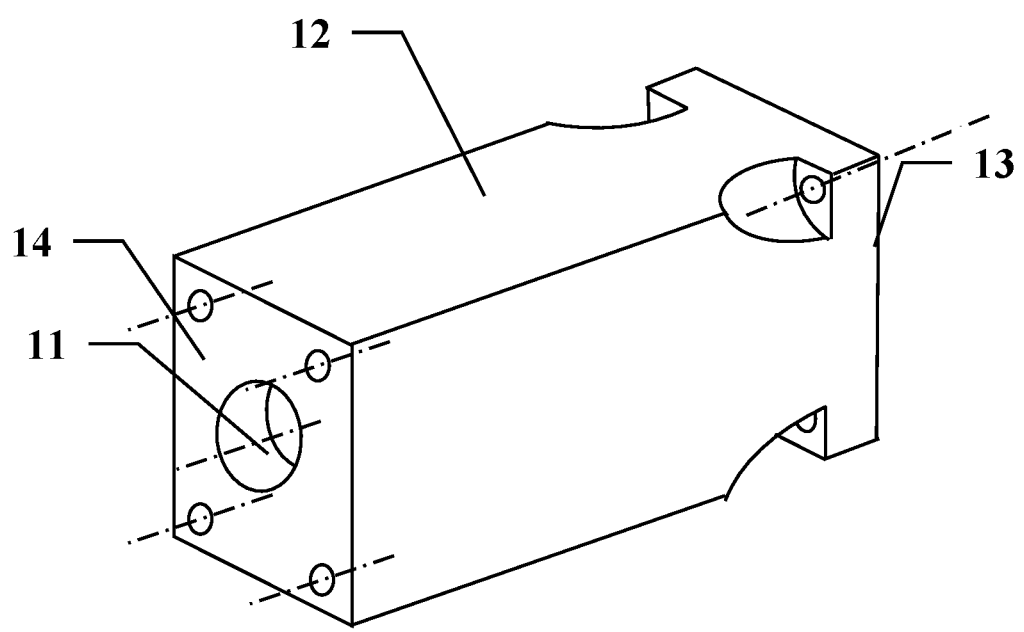
FIG. 11 shows, in perspective view, a mechanical diagram of a rail section.

The mechanical assembly of a section 12 is more particularly illustrated by FIG. 11. The first interface 13 arranged at one end has a complementary shape to the second interface 14 arranged at the other end. In the illustrated example, each of the interfaces 13, 14 has a substantially flat face, perpendicular to the second axis Y of the section 12/rail 2. The first interface 13 is pierced with p, here equal to four, ports capable of letting a screw shank pass through and blocking its head. The second interface 14 is pierced with as many tapped holes, each one facing a hole. Also, with p screws, it is possible to assemble the first interface 13 of a section 12 with the second interface 14 of another section 12.

Figure 9:
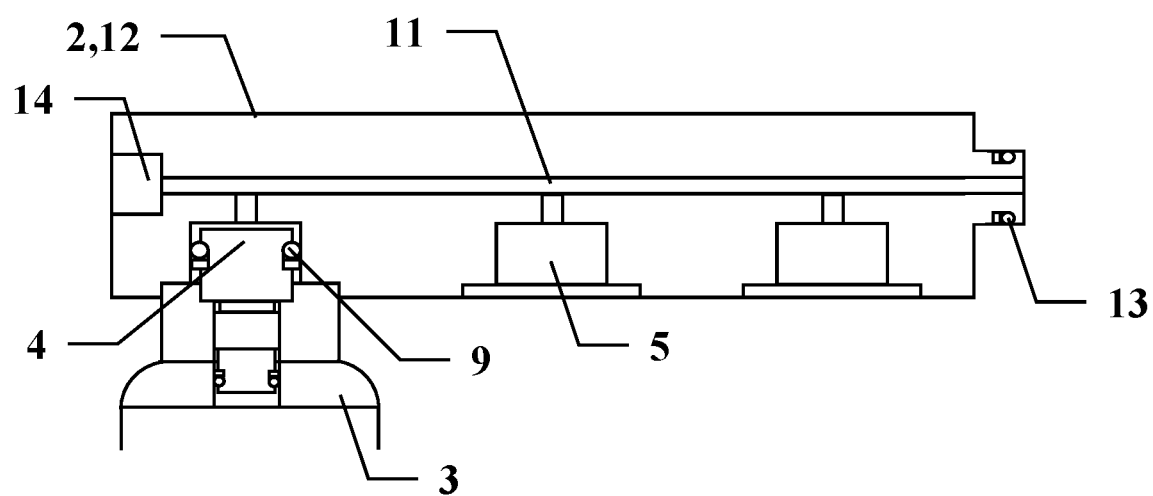
FIG. 9 shows, in a view cut along an XY plane, a rail and a tank.

As shown in FIG. 9, the second pipe 11 passes through a section 12, substantially parallel to the second axis Y. The outlet of the second pipe 11 in the first interface 13 is opposite the outlet of the second pipe 12 in the second interface 14, so as to form a single pipe 11 running the entire length of the rail 2 and serving each of the reception areas 5.

As illustrated, and more particularly in FIG. 9, the second interface 14 comprises a prominence, here cylindrical, while the first interface 13 comprises a complementary cavity, capable of accommodating said prominence. This provides guidance and centering during the assembly of two sections 12.

Figure 13:
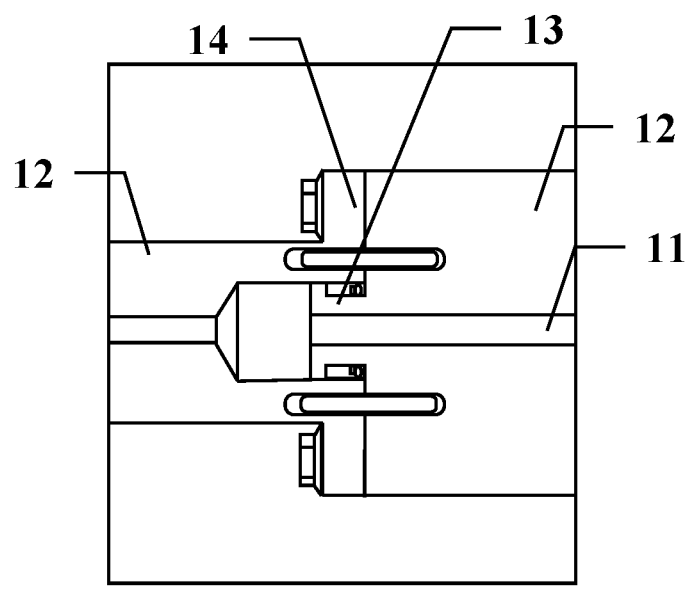
FIG. 13 shows, in a cropped view along an XY plane, the detail of the interface between two rail sections.

FIG. 13 illustrates a cropped view of the assembly between two sections 12. Two pins are also shown.

The assembly between two sections 12 is very similar to the assembly between rail 2 and cylinder 3, except that the ports are not stretched in the form of an arc of a circle in order to allow an angular indexing, which is not so relevant for the sections 12.

Once the sections 12 are assembled to form a rail 2, a first free interface 13 remains at one end of the rail 2 and a second free interface 14 remains at the other end of the rail 2. According to another feature, the first interface 13 accommodates a first end equipment 15, which has a termination along the second interface 14 to allow such a connection. Similarly, the second interface 14 accommodates a second end equipment 16, which has a termination along the first interface 13 to allow such a connection.

Figure 10:
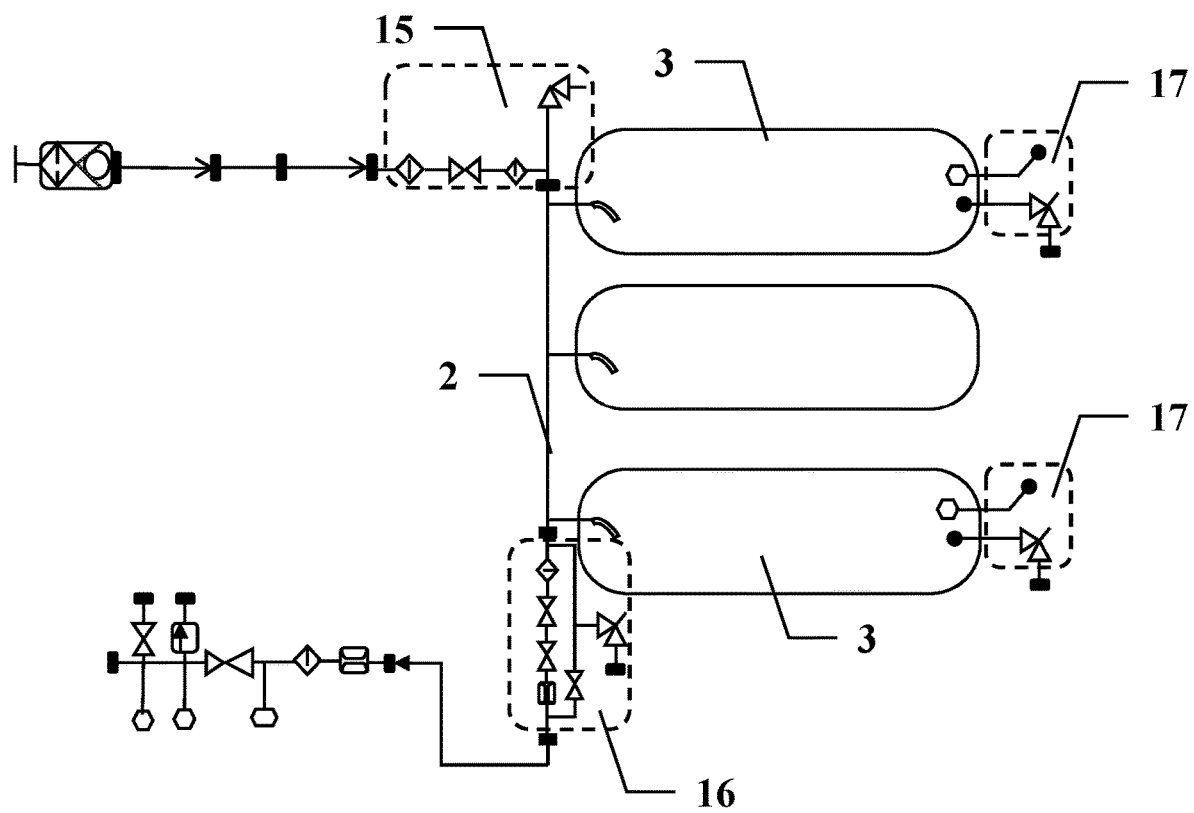
FIG. 10 shows a hydraulic diagram of a tank in its operating environment.

The hydraulic diagram in FIG. 10 illustrates the components required for a tank 1 according to the disclosure. It is necessary to provide a tank 1 with at least one equipment for filling the tank 1 with gas, at least one equipment for drawing gas out of the tank 1 for its use. At least one safety device, such as a release valve, is also provided.

Classically, on rail tanks, a first end equipment is dedicated to filling and drawing, a second end equipment is dedicated to safety. This leads, in a detrimental way, to a very imposing, complex and therefore more expensive filling/drawing component. In addition, this requires longer connection lines, as the filling source is usually not located at the same place as the consumers.

Also, according to another advantageous feature, for the tank according to the disclosure, the first end equipment 15 is designed to allow filling of the tank 1 and the second end equipment 16 is designed to allow drawing from the tank 1. This has the double advantage of simplifying each of the two end equipment items 15, 16 and furthermore of reducing the pipe lengths. One filling pipe extends from the filling source to the filling equipment 15. A further drawing pipe extends from the drawing equipment 16 to the consumer. Either or both of the two end devices 15, 16, in this case the drawing equipment 16, further comprises features for ensuring safety functions. On at least one of the cylinders 3, there is another safety equipment 17 at its end opposite to the one carrying the base 4. This equipment, like a release valve, allows to let the gas escape in case of overpressure, fire, etc. A release nozzle can be oriented, thanks to the disclosure, by orienting the base 4 of the cylinder 3 relative to the reception area 5 of the rail 2, so as to direct the release jet in a desired direction.

The disclosure has been illustrated and described in detail in the drawings and the preceding description. The latter should be considered illustrative and given as an example and not as limiting the disclosure to this description alone. Many variants are possible.

LIST OF REFERENCES

1: tank,
2: rail,
3: cylinder,
4: base,
5: reception area,
6: tapped hole,
7: port,
8: screw,
9: joint,
10: first pipe (base),
11: second pipe (rail),
12: rail section
13: first end of section,
14: second end of section,
15: filling equipment,
16: drawing equipment,
17: safety valve,
18: first cylindrical shape,
19: second cylindrical shape,
20: third cylindrical shape,
21: fourth cylindrical shape,
α: angular opening of a port,
C1: circle of holes,
C2: circle of the ports,
d: diameter of the screws,
D: diameter of C1, C2,
m: blind spot,
X: first axis (base),
Y: second axis: (rail)

The invention claimed is:

1. A tank for pressurized gas comprising:
  at least two cylinders;
  a rail capable of fluidly connecting said at least two cylinders, in order to form a single storage capacity, at least one of the at least two cylinders comprising a base for connection to the rail, the rail comprising at least one reception area of a shape complementary to a shape of the base, in order to be able to receive the base, wherein at least one base has a shape of revolution about a first axis and comprises a number at least equal to n of tapped holes angularly equidistant on a first circle of diameter and whose axis is the first axis, and wherein the at least one reception area comprises a number at least equal to n of ports, in a form of an arc of a circle, angularly equidistant on a second circle having a same diameter as the first circle and whose axis is the first axis, centered on the first axis, of width substantially equal, by greater value, to a diameter of a tapped hole and of angular extent substantially equal to 360°/n; and
  wherein the base is pierced by a first pipe parallel to the first axis, centered on the first axis, and the at least one reception area comprises a second pipe opening out opposite the first pipe.

2. The tank according to claim 1, wherein the number of tapped holes is equal to twice the number of ports.

3. The tank according to claim 1, comprising a number n of screws, each screw having a shank passing through one of the ports, being screwed into one of the tapped holes and having a head resting against an outside of the port.

4. The tank according to claim 1, wherein the base also comprises, at one end, at least one first flat surface perpendicular to the first axis, and the at least one reception area also comprises, opposite said at least one first flat surface of the base, as many second flat surfaces perpendicular to the first axis.

5. The tank according to claim 4, wherein the base has at least one first cylindrical shape, respectively solid or hollow, whose axis is the first axis and of circular section, and the at least one reception area comprises as many second cylindrical shapes, respectively hollow or solid, whose axis is the first axis and of circular section, complementary to said at least one first cylindrical shape, the tank further comprising at least one joint, interposed between said at least one first flat surface and said second flat surface, and/or between said at least one first cylindrical shape and said second cylindrical shape.

6. The tank according to claim 5, wherein the base has at least a third cylindrical shape, respectively hollow or solid, whose axis is the first axis and of circular section and the at least one reception area comprises as many fourth cylindrical shapes, respectively solid or hollow, whose axis is the first axis and of circular section, complementary to said at least one third cylindrical shape, the tank further comprising at least one joint, interposed between said at least one first flat surface and said second flat surface, and/or between said at least one third cylindrical shape and said fourth cylindrical shape.

7. The tank according to claim 1, wherein the base has at least one first cylindrical shape, respectively solid or hollow, whose axis is the first axis and of circular section, and the at least one reception area comprises as many second cylindrical shapes, respectively hollow or solid, whose axis is the first axis and of circular section, complementary to said at least one first cylindrical shape.

8. The tank according to claim 7, wherein the base has at least one third cylindrical shape, respectively hollow or solid, whose axis is the first axis and of circular section, and the at least one reception area comprises as many fourth cylindrical shapes, respectively solid or hollow, whose axis is the first axis and of circular section, complementary to said at least one third cylindrical shape.

9. The tank according to claim 1, wherein the rail extends mainly along a second axis perpendicular to the first axis, comprises at least two sections along the second axis, traversed, along the second axis, by the second pipe.

10. The tank according to claim 9, wherein one of the at least two sections comprises, at a first end, a first connection interface enabling the second pipe to be connected in a sealed manner and, at a second opposite end, a second connection interface enabling the second pipe to be connected in a sealed manner, and wherein the first connection interface of the one of the at least two sections is capable of being connected to the second opposite end of another section of the at least two sections.

11. The tank according to claim 10, further comprising a first end equipment capable of being connected to a first interface and a second end equipment capable of being connected to a second interface.

12. The tank according to claim 11, wherein the first end equipment is configured to fill the tank and the second end equipment is configured to draw from the tank.

13. The tank according to claim 1, wherein the rail comprises a rigid body that extends along a single axis from a first end to a second end.

14. The tank according to claim 13, wherein the rail has a polygonal cross-section.

15. The tank according to claim 13, wherein the rail has an outer side and an inner side facing opposite of, and being parallel to, the outer side, and wherein each of the reception areas is on the inner side.

16. The tank according to claim 15, wherein each reception area comprises the number n of ports that pass through the rail.

17. The tank according to claim 16, wherein the number n of ports are arranged angularly equidistant about an entirety of the second circle.

18. The tank according to claim 16, wherein there are at least four ports.

* * * * *